3,190,914
PROCESS FOR THE PREPARATION OF
AMINO ACIDS
Robert E. Williams, Sherman Oaks, Calif., assignor to
Rexall Drug and Chemical Company, Los Angeles,
Calif., a corporation of Delaware
No Drawing. Filed May 27, 1963, Ser. No. 283,552
7 Claims. (Cl. 260—534)

This invention relates to an improved process for the preparation of compounds known in the art of chemistry as amino acids.

The invention sought to be patented is described as residing in a process for preparing α-amino acids wherein an α-chloro- or α-bromo-lower alkyl carboxylic acid is treated with ammonia in the presence of formaldehyde.

As used throughout the specification and in the claims the term "lower alkyl" embraces straight and branched chain alkyl radicals containing 1 to 5 carbon atoms.

The α-amino acids prepared by the process according to the present invention are compounds well-known in the art of chemistry as the building blocks from which proteins are formed and several are known to be indispensable in maintaining normal life. Glycine, the simplest of the α-amino acids, is commonly employed medicinally as a gastric antacid.

The classic method for preparing these α-amino acids has been by means of the treatment of α-halo-lower alkyl carboxylic acids with aqueous ammonia (Perkin and Duppa, Ann. 108: 106 (1858)). It was noted at an early date that the yields by this method were only 10–15% of theoretical. For example, in the preparation of glycine by this method the principal products of the reaction were found to be iminodiacetic acid and nitrilotriacetic acid. Considerable effort has been directed toward modifying and improving this classic process so as to increase yields.

The best of these improved methods requires the use of relatively expensive ammonium salts, such as for example ammonium carbonate, and as much as 60 moles of ammonia for each mole of the halo-acid. Even then the yield of pure α-amino acid is only about 60% and the cost of recovering the excess ammonia is prohibitive.

The method according to the present invention presents the economic advantages of requiring relatively inexpensive materials, a low ammonia to halo-acid ratio and yields of 70 to 80% pure amino acid product.

The manner and process of carrying out and using this invention will now be described to enable a person skilled in the art of chemistry to carry out and use the same as follows:

The preparation of α-amino acids according to the present invention is illustrated by the following equation:

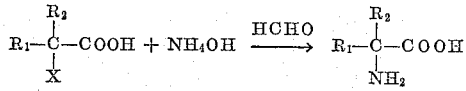

wherein $R_1$ and $R_2$ are hydrogen or alkyl groups of 1 to 4 carbon atoms and the

group contains 1 to 5 carbon atoms, and X is chlorine or bromine.

The starting materials used in carrying out the process of this invention are all well known compounds that are readily obtainable commercially.

Among the α-halo-lower alkyl carboxylic acids which may be employed as starting materials in the process of this invention are chloroacetic acid for preparing glycine, α-bromopropionic acid for the preparation of alanine, α-bromoisovaleric acid for preparing valine, α-bromovaleric acid for preparing nor-valine, α-chloroisocaproic acid for preparing leucine and α-bromo-β-methyl-n-valeric acid for preparing isoleucine. Although generally less reactive than the α-bromo acids the α-chloro acids are preferred because they are less expensive.

In carrying out the process of the present invention, the α-halo-lower alkyl carboxylic acid starting material, ammonia and formaldehyde are reacted at a temperature of about 0° C. to about 50° C. for a sufficient time to insure completion of the reaction. Elevated temperatures in excess of 50° C. result in a discolored product and should be avoided. The molar ratio of ammonia to α-halo-lower alkyl carboxylic acid should be between 1:1 and about 6:1, with a molar ratio of 2:1 to 4:1 being preferred. The reaction mixture should preferably contain about 1.5 to 3 moles of ammonia per mole of formaldehyde with a 2:1 molar ratio being preferred. The reaction time will depend upon the temperature and the number of carbon atoms in the α-halo acid and will normally range from about 1 to about 40 hours. The reaction is preferably carried out in an aqueous medium.

At the conclusion of the reaction, the mixture is concentrated and the α-amino acid product is crystallized by the addition of a solvent in which it is insoluble, such as methanol, acetone, ethanol and the like. The formaldehyde may be recovered from the liquid phase and utilized in subsequent runs.

In a preferred embodiment of the invention, an aqueous solution of formaldehyde is added to the α-halo loweralkyl carboxylic acid. The resulting solution is then added to an aqueous solution of ammonia with cooling and stirring and the reaction is permitted to go to completion.

The best mode contemplated by the inventor of carrying out this invention will now be set forth as follows:

*Example 1*

Formaldehyde (83 ml. of 37% aqueous solution, 1 mole) is added slowly with cooling to 94.5 grams (1 mole) of monochloroacetic acid. The solution is then added with cooling and stirring to 135 ml. of concentrated aqueous ammonium hydroxide (2 moles). The temperature is kept at below 10° C. during the addition. After addition is finished, the reaction mixture is stirred at 30° C. for 24 hours and then is concentrated under vacuum at about 60° C. to a volume of 200 ml. Methanol (600 ml.) is added and after cooling, glycine is collected. The glycine is dried and weighed. Yield: 53.8 grams (72% of theoretical).

*Example 2*

The procedure described in Example 1 is repeated, utilizing 1.5 moles of formaldehyde and 3 moles of ammonia. Yield of glycine is 92% of theoretical at a reaction time of 4 hours at 30° C. One recrystallization from aqueous methanol yields white crystalline glycine, at a yield 80% of theoretical.

*Example 3*

The procedure described in Example 1 is repeated, utilizing 2 moles of formaldehyde and 4 moles of ammonia. Yield of glycine is 81.2% of theoretical at a reaction time of 4 hours at 30° C. One recrystallization from aqueous methanol yields white crystalline glycine at a yield of 76.6% of theoretical.

The method of this invention is characterized by improved yields, simple manipulative steps and utilization of inexpensive materials and equipment, thus representing a marked improvement over prior art processes for the production of α-amino acids. The particular advantage of this method lies in the fact that high yields are obtained with low ratios of ammonia to the α-halo-lower alkyl carboxylic acid starting material. The method of the invention is particularly adapted to the preparation of the widely used amino acid, glycine.

This application is a continuation-in-part of my copending application Serial Number 232,305, filed October 22, 1962, and now abandoned.

The subject matter which the applicant regards as his invention is particularly pointed out and distinctly claimed as follows:

1. A method of preparing α-amino lower alkyl carboxylic acids which comprises treating an α-chloro lower alkyl carboxylic acid with ammonia and formaldehyde in an aqueous reaction medium at a temperature of about 0° C. to about 50° C., the molar ratio of ammonia to said α-chloro lower alkyl carboxylic acid being between about 1:1 and about 6:1 and the molar ratio of ammonia to formaldehyde being between about 1.5:1 and about 3:1.

2. A method of preparing α-amino lower alkyl carboxylic acids which comprises treating an α-bromo lower alkyl carboxylic acid with ammonia and formaldehyde in an aqueous reaction medium at a temperature of about 0° C. to about 50° C., the molar ratio of ammonia to said α-bromo lower alkyl carboxylic acid being between about 1:1 and about 6:1 and the molar ratio of ammonia to formaldehyde being between about 1.5:1 and about 3:1.

3. A method according to claim 1 wherein the molar ratio of ammonia to said α-chloro lower alkyl carboxylic acid is between 2:1 and 4:1 and the molar ratio of ammonia to formaldehyde is 2:1.

4. A method according to claim 2 wherein the molar ratio of ammonia to said α-bromo lower alkyl carboxylic acid is between 2:1 and 4:1 and the molar ratio of ammonia to formaldehyde is 2:1.

5. A method of preparing glycine which comprises treating monochloroacetic acid in an aqueous medium at a temperature of about 0° C. to about 50° C. with ammonia and formaldehyde in the relative molar proportions of about 1 to about 6 moles of ammonia per mole of monochloroacetic acid and about 1.5 to about 3 moles of ammonia per mole of formaldehyde.

6. A method of preparing glycine which comprises adding an aqueous solution of formaldehyde to monochloroacetic acid, adding the resulting solution to an aqueous solution of ammonia and stirring the resulting mixture at a temperature between about 0° C. and about 50° C., said mixture containing about 1 to about 6 moles of ammonia per mole of monochloroacetic acid and about 1.5 to aobut 3 moles of ammonia per mole of formaldehyde.

7. A method according to claim 6 wherein said mixture contains 2 to 4 moles of ammonia per mole of monochloroacetic acid and 2 moles of ammonia per mole of formaldehyde.

References Cited by the Examiner

UNITED STATES PATENTS

| | | | |
|---|---|---|---|
| 1,774,929 | 9/30 | Hanot | 260—248.6 |
| 2,640,826 | 6/53 | MacLean | 260—248.6 |

OTHER REFERENCES

Hillmann, Chemical Abstracts, vol. 43, (1949), page 6695.

LORRAINE A. WEINBERGER, *Acting Primary Examiner.*

LEON ZITVER, *Examiner.*